(12) United States Patent
Schweizer et al.

(10) Patent No.: US 8,091,966 B2
(45) Date of Patent: Jan. 10, 2012

(54) BACKREST STRUCTURE FOR A MOTOR VEHICLE SEAT

(75) Inventors: Sebastian Schweizer, Coburg (DE);
Cornelia Brueckner, Weidach (DE);
Wera Wolniczak, Grub am Forst (DE);
Guido Neumann, Ilmenau (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 220 days.

(21) Appl. No.: 12/556,412

(22) Filed: Sep. 9, 2009

(65) Prior Publication Data

US 2010/0066143 A1   Mar. 18, 2010

(30) Foreign Application Priority Data

Sep. 10, 2008 (DE) .................... 10 2008 047 249

(51) Int. Cl.
*A47C 7/46* (2006.01)
(52) U.S. Cl. .................. 297/284.8; 297/284.7
(58) Field of Classification Search ............... 297/284.8, 297/284.7, 284.4
See application file for complete search history.

(56) References Cited

U.S. PATENT DOCUMENTS

| | | | | |
|---|---|---|---|---|
| 5,462,335 A * | 10/1995 | Seyler | ............ | 297/284.4 |
| 6,036,265 A | 3/2000 | Cosentino | | |
| 6,338,530 B1 * | 1/2002 | Gowing | ............ | 297/284.4 |
| 6,908,153 B2 * | 6/2005 | Blendea | ............ | 297/284.4 |
| 7,309,105 B2 * | 12/2007 | Mundell et al. | ............ | 297/284.4 |
| 7,488,039 B2 | 2/2009 | Fischer et al. | | |

FOREIGN PATENT DOCUMENTS

| | | |
|---|---|---|
| DE | 203 13 925 U1 | 11/2004 |
| DE | 10 2007 003 642 A1 | 7/2008 |
| EP | 0 153 390 B1 | 9/1985 |
| EP | 0 458 440 A1 | 11/1991 |
| WO | WO 03/031222 A1 | 4/2003 |

\* cited by examiner

*Primary Examiner* — Milton Nelson, Jr.
(74) *Attorney, Agent, or Firm* — Christie, Parker & Hale, LLP (57) ABSTRACT

A backrest structure for a motor vehicle seat includes a rest frame forming the supporting structure of the backrest. The rest frame includes at least two longitudinal struts running in the longitudinal direction of the backrest. The backrest structure also includes a lumbar support arranged on the front side of the rest frame for supporting the back region of a motor vehicle occupant. The lumbar support includes a transverse traverse being adjustable along the longitudinal struts with a height adjusting device, to which a support device is hinged and is adjustable with a depth adjusting device substantially perpendicular to the transverse traverse. The lumbar support further includes a retaining device supporting the transverse traverse and extending substantially in the longitudinal direction of the backrest and receiving the height adjusting device.

20 Claims, 11 Drawing Sheets

BACKREST STRUCTURE FOR A MOTOR VEHICLE SEAT

CROSS-REFERENCE TO RELATED APPLICATION

This application claims priority to and the benefit of German Patent Application Number 10 2008 047 249.2, filed on Sep. 10, 2008, the entire content of which is incorporated herein by reference.

BACKGROUND

The invention relates to a backrest structure of a motor vehicle seat.

Such a backrest structure is known from DE 10 2007 003 642 A1 and comprises a rest frame of a backrest having a front side facing the back of the motor vehicle occupant along which front side the spinal column of the motor vehicle occupant extends in the longitudinal direction of the rest when the motor vehicle seat is used as intended. The rest frame is connected to two longitudinal struts or frame parts extending in the longitudinal direction of the backrest, on which longitudinal struts or frame parts a carrier element in the form of a carrier plate is adjustably arranged in the longitudinal direction of the longitudinal struts, which carrier element supports a lumbar support for supporting the lumbar vertebrae region of the motor vehicle occupant which is arranged at the front side of the rest frame.

In order to individually adapt the lumbar support to the back of a motor vehicle occupant, two adjusting devices are provided, one of which being a height adjusting device adjusting the lumbar support in the longitudinal direction of the backrest, i.e. substantially in the direction of the vertical vehicle axis Z by moving the carrier element along the longitudinal struts. A depth adjusting device serves for adjusting the stroke of the lumbar support in the direction of the longitudinal vehicle axis X, i.e. perpendicular to the extension plane of the rest frame, in order to adjust the bulge of a rest cushion that is arranged in front of the rest frame and the lumbar support and via which the back of the vehicle occupant is supported on the lumbar support.

The supporting element of the known lumbar support substantially covers the whole back region of the motor vehicle occupant and comprises supporting cushions of the lumbar support in the lumbar vertebrae region. On the one hand, this causes a correspondingly large installation space for adjusting the height of the lumbar support and on the other hand a large weight of the lumbar support usually consisting of metal.

SUMMARY

The underlying problem of the present invention is to provide a lumbar support for a backrest structure of the aforementioned kind which, assuring a high safety standard and optimal functionality of the height and depth adjustment of the lumbar support, is simple in design, requires a minimal installation space and comprises a low weight.

An exemplary solution according to an exemplary embodiment of the invention provides a lumbar support for a backrest structure of a motor vehicle seat that satisfies highest safety requirements while having a simple design at the same time, and allows for an optimal height and depth adjustment of the lumbar support with respect to the back of the motor vehicle occupant and thereby requires minimal installation space as well as comprises a low weight. The high safety requirements are thereby achieved by a stiff structure of the backrest and lumbar support while the minimal installation space and the low weight of the lumbar support are achieved by a reduction of the dimensions of the supporting elements of the lumbar support, whose shape and mutually supporting arrangement however assures the required connection stiffness and therefore fulfills the high safety requirements.

The exemplary solution according to an exemplary embodiment of the invention thereby starts from the consideration to substitute the large-area carrier plate of the lumbar support by carrier elements and adjusting devices adapted to the respective functions and to connect these parts to each other in a way that a synergetic effect is achieved.

Thereby, the retaining device supporting the transverse traverse extending substantially in the longitudinal direction of the rest, and receiving the height adjustment, fixes the lumbar support between the longitudinal struts and assures at the same time the guiding and support of the function elements of the height adjusting device. Thus, a simple design of the lumbar support is assured and by means of the stationary arrangement of the function elements of the height adjusting device which in contrast to the state of the art must not be moved along, a minimal installation space is required, since no corresponding installation space has to be provided for the moved along function elements of the height adjusting device.

Exemplary, the retaining device is connected to the longitudinal struts and guides or supports the transverse traverse receiving the supporting device for stroke adjustment in the adjusting direction.

By means of the connection of the retaining device to the longitudinal struts, the latter are not only used for guiding the transverse traverse during a height adjustment, but also as supporting elements of the retaining device.

In an exemplary embodiment, the retaining device consists of a profiled retaining plate having a middle leg butting against the transverse traverse and lateral legs coming off the middle leg, which lateral legs are either connected to the longitudinal struts or to the transverse struts which bend down from the longitudinal struts and/or connect the longitudinal struts to each other.

This shape of the retaining device allows on the one hand a firm connection to the longitudinal struts and therewith to the supporting structure of the backrest, and on the other hand an optimal support of the transverse traverse extending between the longitudinal struts in their middle region, so that a bending of the transverse traverse is avoided.

The composition of the retaining device out of a middle leg and lateral legs coming off the middle leg is achieved in a preferred form by a T-shaped, Y-shaped, double-T-shaped or double-Y-shaped retaining plate.

While in the embodiment of the retaining device as a T-shaped or Y-shaped retaining plate the middle leg of the retaining device is only supported on the longitudinal or transverse struts on one side, in case of the embodiment of the retaining device as a double-T-shaped or double-Y-shaped retaining plate, a double-sided support of the retaining plate and therewith of the retaining device is achieved.

The division of functions of the lumbar support into the retaining device receiving the height adjusting device and the transverse traverse receiving the depth adjusting device, allows to employ the height adjusting device as a spindle supported on the middle leg, a spindle nut connected to the transverse traverse, which nut engages the spindle, and a spindle drive of the height adjusting device connected to the retaining plate, the longitudinal or transverse struts or the rest frame, since these elements are arranged stationary, wherein the spindle and the spindle nut are integrated into the retaining device or the transverse traverse and only the spindle drive requires an installation space determined by its installation size, but however does not require an installation space required for a moved along spindle drive and adjustment travel that has to be kept free.

Due to the support of the transverse traverse by means of the retaining device, a small carrier plate extending between the longitudinal struts can be employed as a transverse traverse, which carrier plate is form-fittedly guided on the longitudinal struts for the height adjustment of the lumbar support.

Exemplary, the supporting device connected to the transverse traverse comprises two support bails extending perpendicular to the longitudinal direction of the rest, which supporting bails are pivotably hinged to the transverse traverse about an axis extending in the longitudinal direction of the rest and are pivotable towards the transverse traverse or away from the transverse traverse by means of the depth adjusting device.

This embodiment of a supporting device assures a minimal installation depth of the lumbar support and therewith a minimal backrest thickness or a maximal stroke adjustment of the lumbar support at a given installation depth of the backrest.

The depth adjusting device for stroke adjustment of the lumbar support exemplary consists of a spindle or lever drive for pivoting the supporting bails, wherein the transverse traverse contains guiding rails on which two gliders are guided which are movable in opposite directions and pivot the supporting bails via ramp sections formed on the gliders and/or on the supporting bails, wherein the gliders are connected to a spindle nut which engage two thread sections of the spindle of the depth adjusting device having opposite thread pitches. A spindle drive connected to the transverse traverse, which spindle drive consists of a drive motor and a gear serves for driving the spindle.

This further exemplary embodiment of the solution according to the invention allows for an especially flat design of the depth adjusting device and the stroke adjustment of the lumbar support by using gliders for adjusting the lumbar support perpendicular to the extension plane of the rest frame, which gliders substantially move along the extension plane of the rest frame or slightly oblique thereto and thereby interact with the supporting bails via a ramp in a way that their position together with the lumbar support itself is adjusted across the movement direction of the gliders.

A further exemplary possibility for saving weight without disturbance of the function and stability of the lumbar support which is particularly suitable for air-conditioned comfort seats in motor vehicles, consists in at least one recess in a carrier plate of the transverse traverse and/or the middle leg and/or the lateral legs of the retaining device.

This further exemplary solution leads to a further cost and weight optimization due to the even lower material usage as well as to an improved flow behaviour of the air current of a ventilator unit for air-conditioning a motor vehicle seat, since the lumbar support in an air-conditioned comfort seat having one or several ventilator units built into the seat rest moves at least in certain positions of the height adjustment of the transverse traverse in front of the air current of the ventilator unit and therefore would deteriorate the air-conditioning function of the motor vehicle seat in a severe manner.

Exemplary, the at least one recess consist of an ellipsoidal or polygonal breakthrough in the center of the carrier plate, which breakthrough is aligned in the longitudinal direction of the carrier plate.

The breakthrough in the center of the carrier plate assures that the air current of a ventilator unit for air-conditioning of the motor vehicle seat can reach the front side of the backrest substantially undisturbed in certain positions of the height adjustment of the lumbar support upon adjusting the carrier plate, so that an improved flow behaviour of the ventilator stream is assured and therewith the air-conditioning function of the motor vehicle seat is not disturbed.

In addition thereto, two ellipsoidal apertures can be arranged on top of each other and on both sides of the breakthrough, respectively, whose major axes are aligned parallel to the longitudinal extension of the carrier plate.

For increasing the firmness structure particularly in case of a very thin carrier plate, the boundary region of the breakthrough and/or the apertures in the carrier plate can be provided with beads or flanges, which avoid a bending of the carrier plate also in consideration of the stabilization function of the retaining plate.

A further measure for cost and weight optimization by means of a reduced material usage as well as for improving the flow behaviour of the air current of a ventilator unit, consists in providing a recess in the middle leg of the retaining device running in the longitudinal direction of the middle leg.

BRIEF DESCRIPTION OF THE DRAWINGS

Embodiments shown in the Drawings shall contribute to a better understanding of the invention and shall point out different possibilities for the realization of the invention.

DETAILED DESCRIPTION

Figure 1:
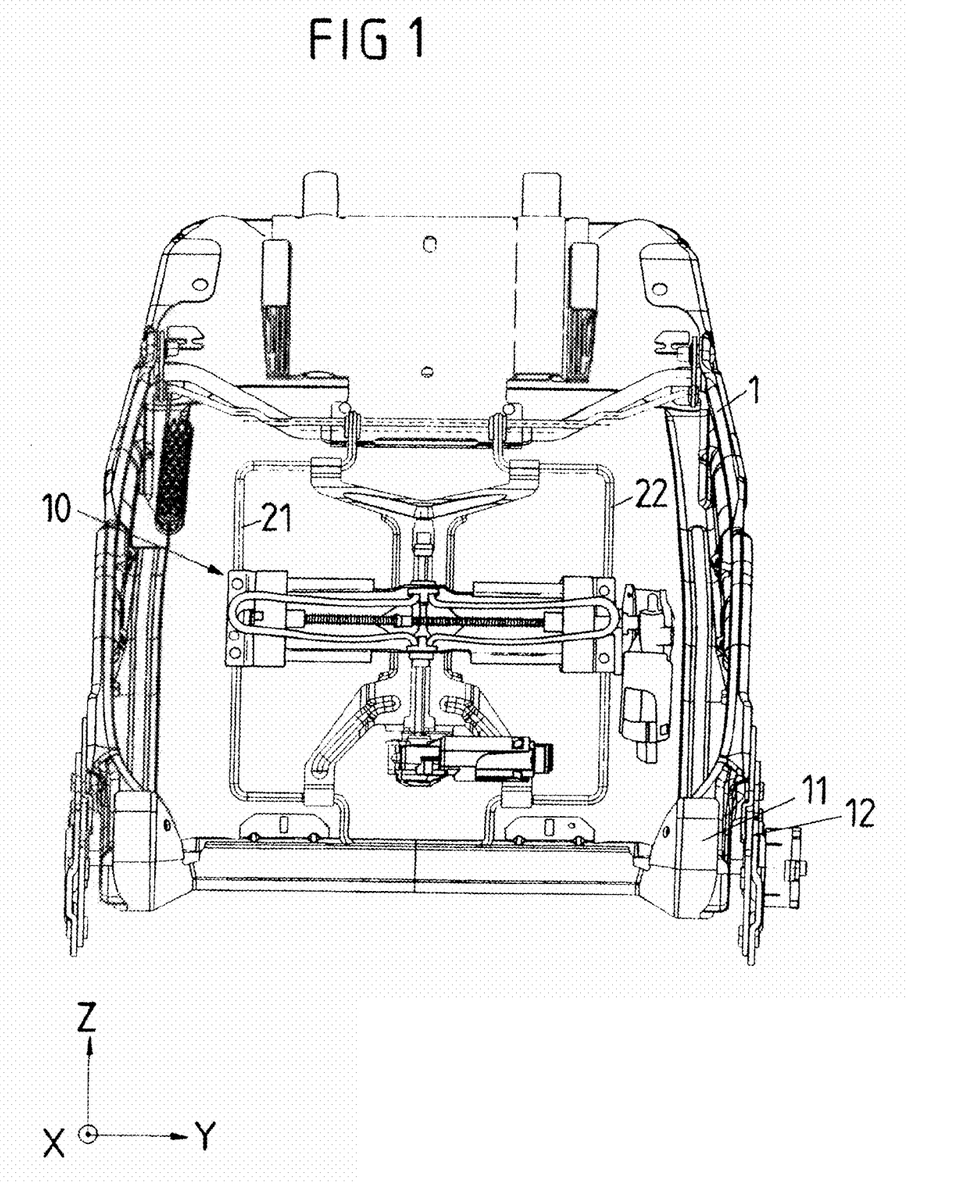
FIG. 1 shows a perspective front view of the backrest structure of a motor vehicle seat having a lumbar support with a height and depth adjusting device according to the invention.
Figure 2:
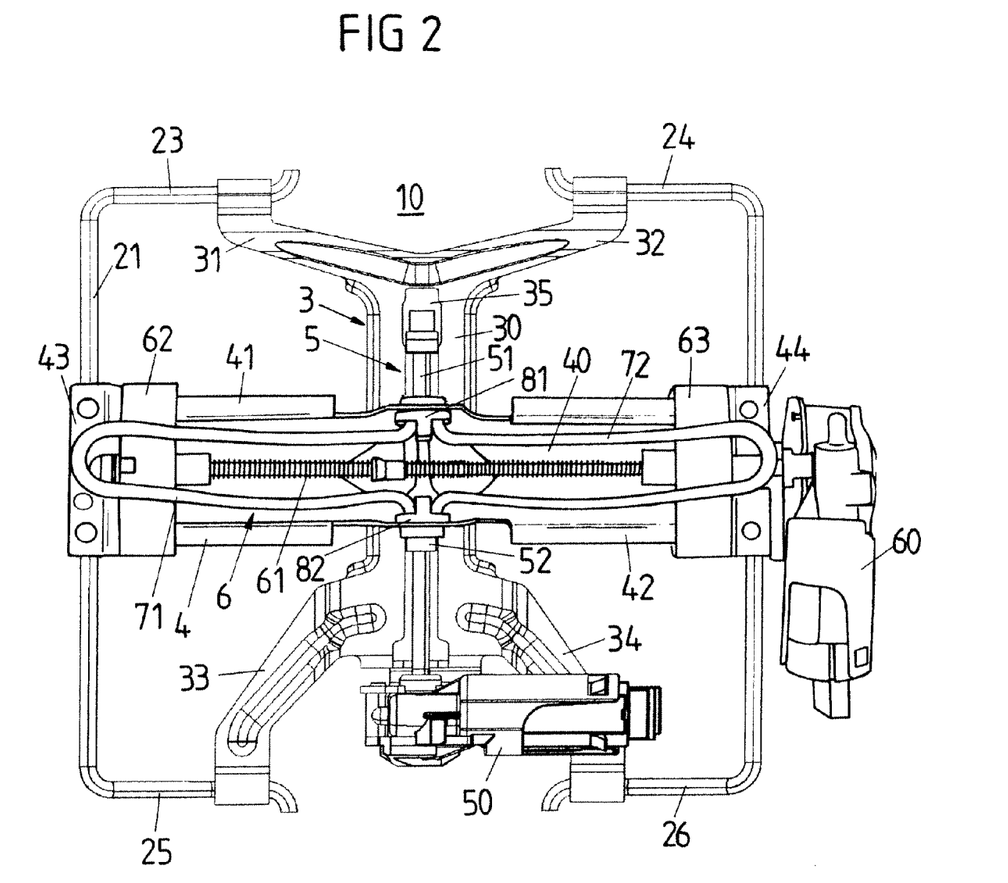
FIG. 2 shows a front side view of the lumbar support having a height and depth adjusting device according to FIG. 1.
Figure 3:
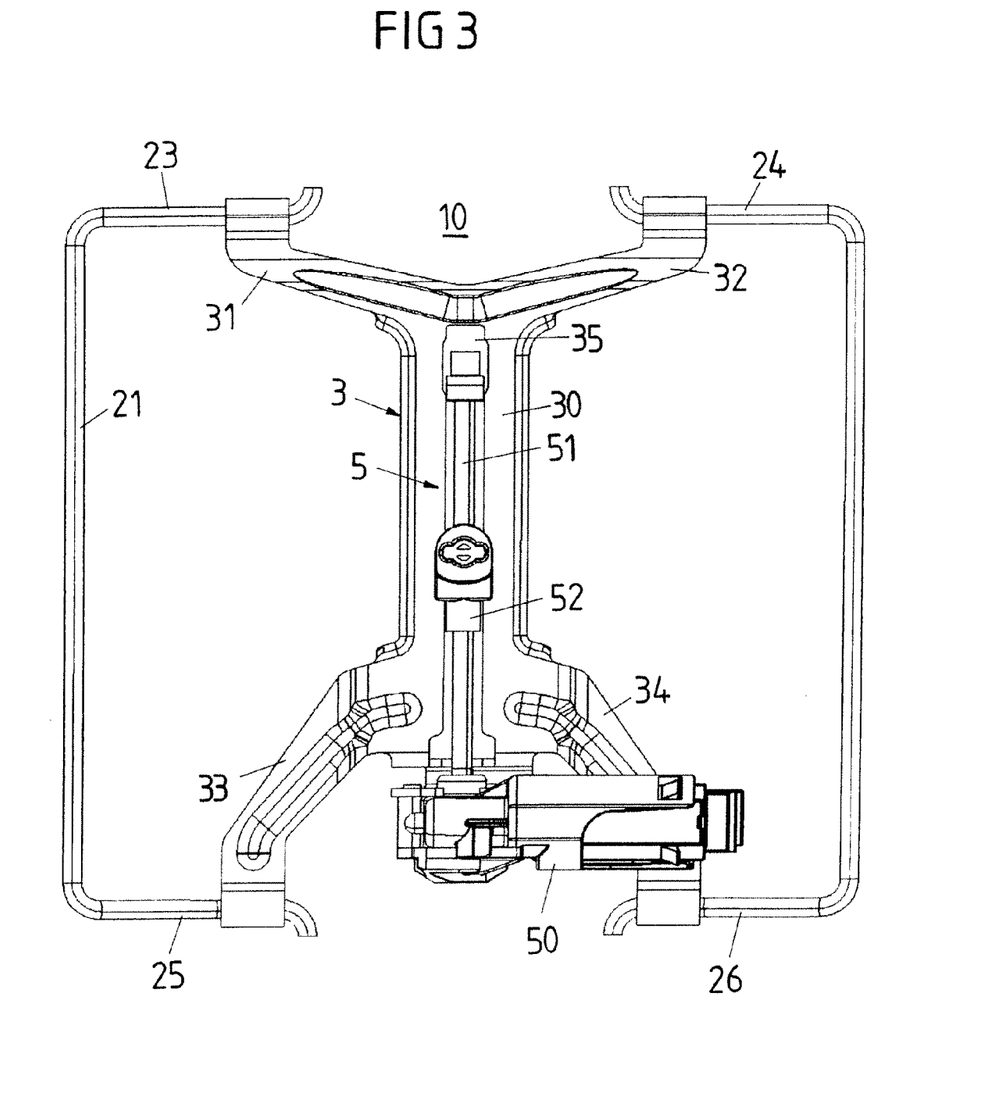
FIG. 3 shows a front side view of the retaining device having a height adjusting device of the lumbar support according to FIG. 2.
Figure 4:
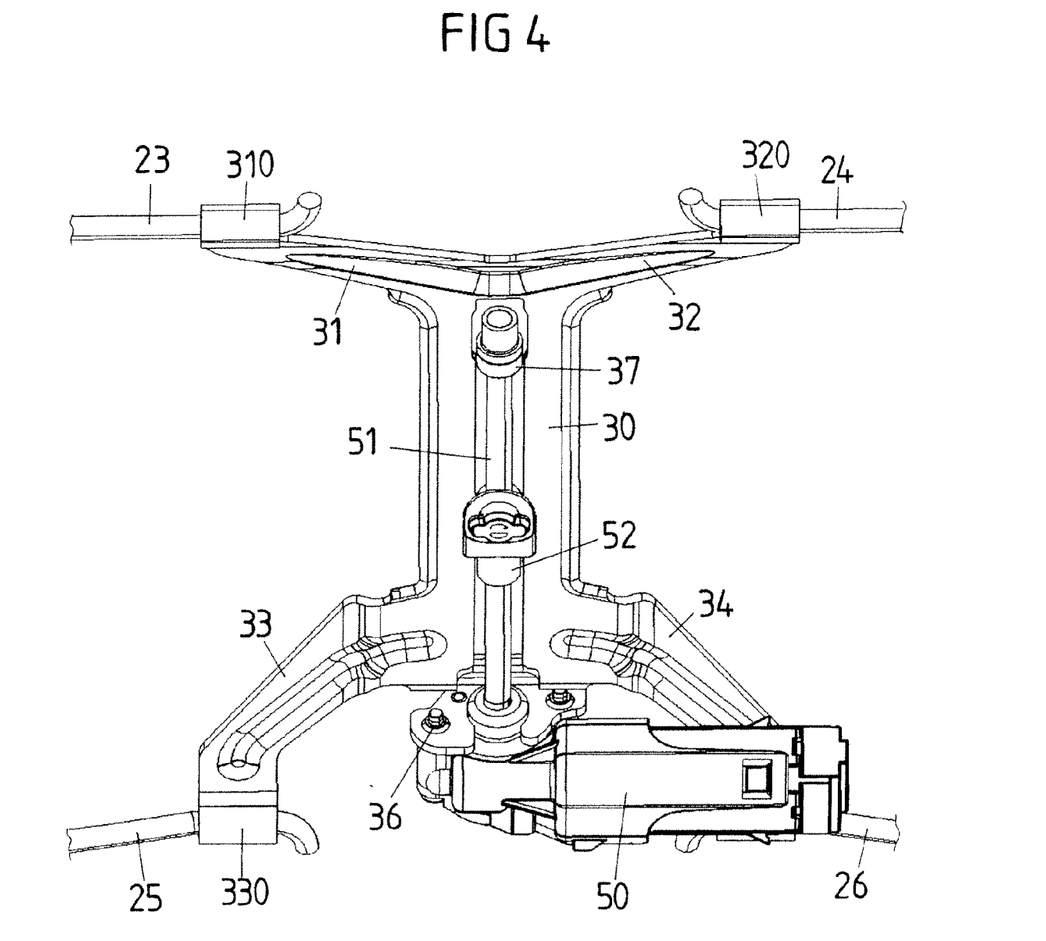
FIG. 4 shows a perspective view of the retaining and height adjusting device according to FIG. 3.
Figure 5:
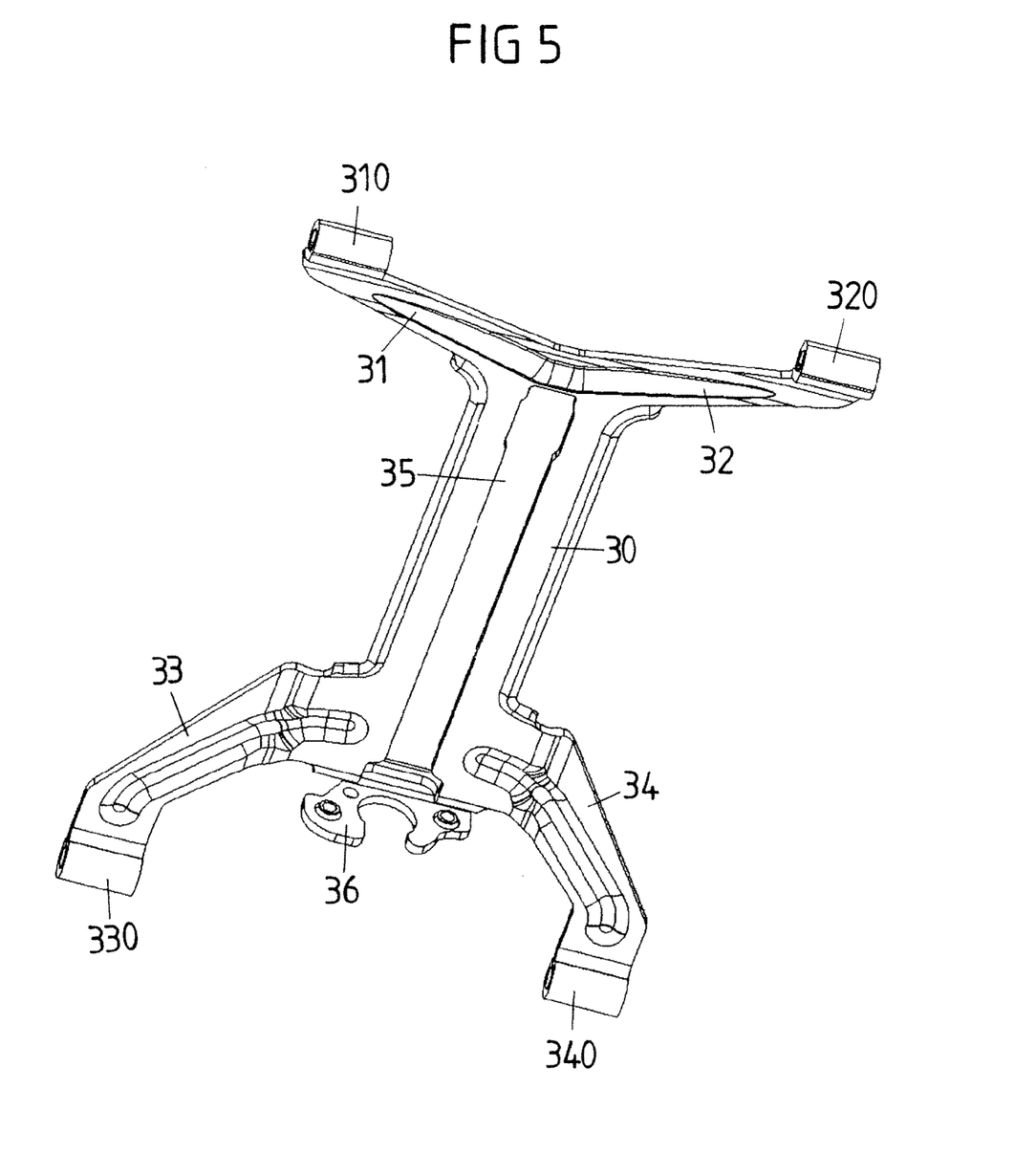
FIG. 5 shows a perspective view of the retaining device formed as a double-T-shaped or double-Y-shaped retaining plate.
Figure 6:
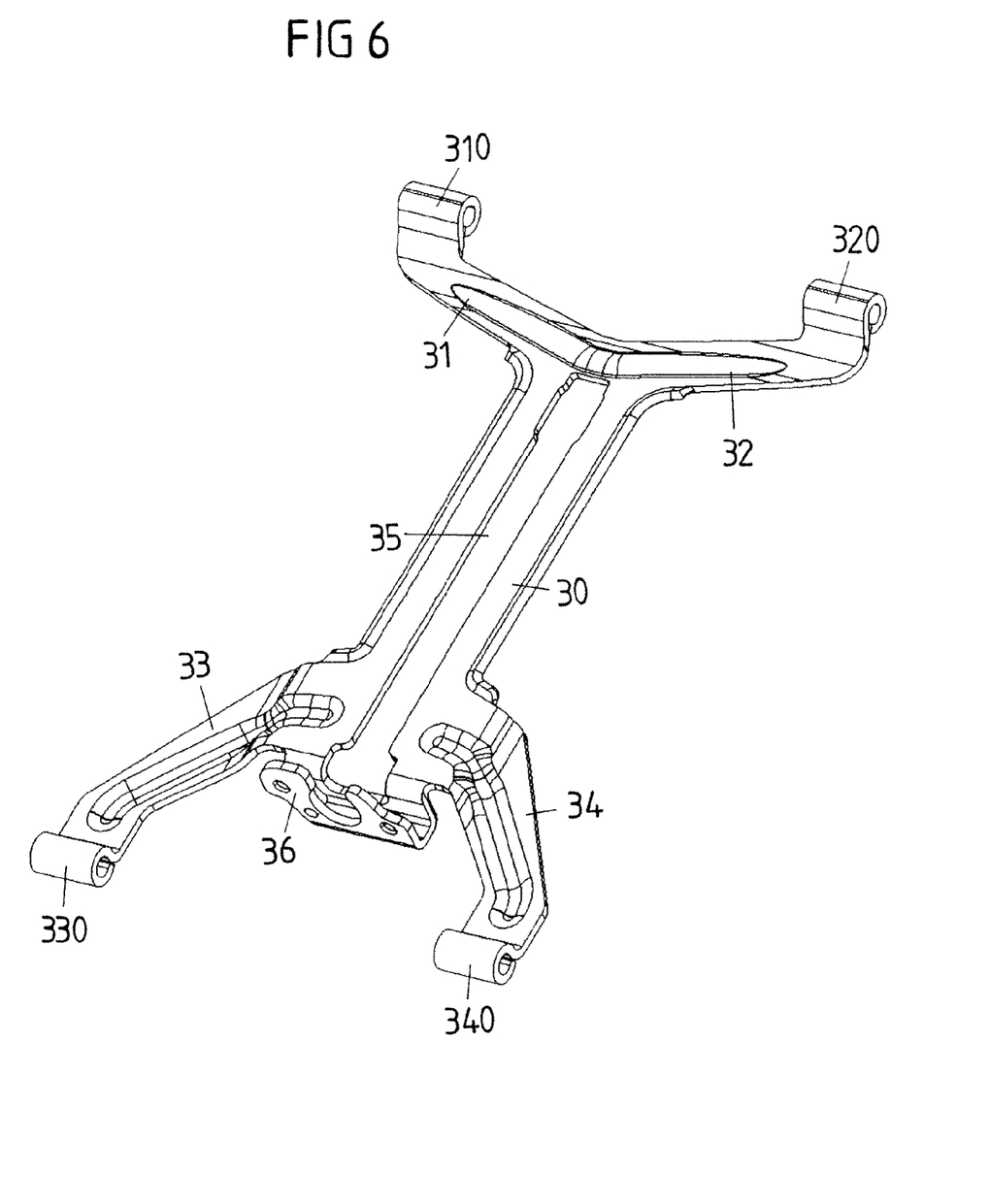
FIG. 6 shows a perspective view of the retaining device formed as a double-T-shaped or double-Y-shaped retaining plate.

FIG. 1 shows a rest frame 1 of a backrest of a motor vehicle seat, which is connected to a seat part of the motor vehicle seat via an adjusting axis 11 and fittings 12 and serves for supporting the back of a vehicle occupant. The rest frame 1 being pivotable about the adjusting axis 11 is substantially aligned in the direction of the vertical vehicle Z-axis with respect to an upright position, and the area spanned by the rest frame 1 extends in the plane of the vertical vehicle or Z-axis and the transverse vehicle or Y-axis. The rest frame 1 is connected to two longitudinal struts 21, 22 aligned parallel to each other, which longitudinal struts 21, 22 receive a lumbar support 10.

In order to clarify the alignment of the rest frame 1 and the lumbar support 10, a coordinate system is shown that contains the vertical vehicle or Z-axis, the transverse vehicle or Y-axis and the longitudinal vehicle or X-axis projecting out of the plane of projection or into the plane of projection, respectively.

The lumbar support 10 being shown partially or completely in a first embodiment in FIGS. 1 to 6 comprises a retaining device 3 having a height adjusting device 5 as well as a transverse traverse 4 having a depth adjusting device 6.

The retaining device 3 comprises a small retaining plate having a middle leg 30 running parallel between the longitudinal struts 21, 22, on which frontal ends the lateral legs 31 to 34 are attached, which, together with the middle leg 30, assume a double-Y-shape. The lateral legs 31 to 34 are connected to transverse struts 23 to 26 by means of beads or bushings 310, 320, 330, 340, which transverse struts bend from the longitudinal struts 21, 22 and are connected to each other or with the rest frame 1.

The middle leg 30 comprises a recess 35 running in the longitudinal direction, in which a spindle 51 of the height adjusting device 5 is arranged. The spindle 51 is driven by an electromotive spindle drive 50 of the height adjusting device 5, which is hinged to a flange 36 protruding from the lower end of the middle leg 30 perpendicular to the longitudinal extension of the middle leg 30.

A spindle nut 52 meshes with the spindle 51, which spindle nut 52 is connected to the transverse traverse 4 in a rotationally fixed manner, so that upon a rotation of the spindle 51 by means of the spindle drive 50 in the one or in the other rotation direction, the transverse traverse 4 is moved along the middle leg 30, i.e. upwards or downwards with respect to the rest frame 1. The spindle 51 is supported on an end side of the middle leg 30 of the retaining device 3.

The transverse traverse 4 consists of a profiled, small carrier plate 40 that extends between the longitudinal struts 21, 22 and is connected to the longitudinal struts 21, 22 via form-fitted guiding elements 43, 44, on which the transverse traverse 4 slides along driven by the height adjusting device 5.

Thereby, the transverse traverse 4 extends along the horizontal transverse axis Y, i.e. perpendicular to the longitudinal direction of the rest or the vertical vehicle axis Z from the one longitudinal strut 21 to the other longitudinal strut 22 and is connected to a depth adjusting device 6 by means of which the lumbar support 10 is adjusted perpendicular to the plane spanned by the rest frame 1, i.e. along the X-direction of the motor vehicle in case of a backrest aligned perpendicularly. The depth adjusting device 6 contains two supporting bails 71, 72 which are pivotably hinged to swivels 81, 82 which are centrically connected to the retaining plate 40 of the transverse traverse 4. Each of the two supporting bails 71, 72 respectively extends from both of its ends pivotably hinged to a swivel 81 or 82, respectively, to one of the both lateral boundaries of the transverse traverse 4.

Angled end sections of the substantially U-shaped supporting bails 71, 72 serve as bearing sections of the supporting bails 71, 72 which are formed non-planar, but comprise a curvature moreover, so that they respectively define a ramp of variable curvature which interacts with an associated glider 62, 63 of a glider arrangement of the depth adjusting device 6.

Both gliders 62, 63 are guided in the extension direction of the legs of the U-shaped supporting bails 71, 72 on guiding rails 41, 42 arranged or formed on the carrier plate 40 of the transverse traverse 4. Thereby, they reach under both of the supporting bails 71, 72 at their bent sections and interact with these in a ramp-like manner according to the wedge principle.

Both gliders 62, 63 are movable in opposite directions along the respectively associated guiding rail 41, 42 in the horizontal transverse direction Y by means of a spindle 61 driven by a spindle drive 60, which spindle 61 is connected to a centering element comprising to thread sections having threads of opposite thread pitch namely a thread section having a left-hand thread and a thread section having a right-hand thread. Each of the two thread sections interacts with an associated internal thread in both of the gliders 62, 63, wherein, alternatively, the corresponding internal thread can also be respectively formed by a spindle nut which is arranged in a respective glider 62, 63, particularly pressed in. Alternatively, the spindle nut can be integrally formed with the respective glider 62, 63.

Due to the different pitch of both thread sections of the spindle 61, both gliders 62, 63 are moved in opposite directions either towards each other, i.e. towards the retaining device 3 or away from each other, i.e. towards a lateral boundary of the carrier plate 40 or the longitudinal struts 21, 22, upon rotation of the spindle 61, depending on the rotation direction of the spindle drive 60.

Due to the interaction of the gliders 62, 63 with the respectively associated bent ramp-like section of the one or the other supporting bail 71, 72, the supporting bails 71, 72, upon displacement of the gliders 62, 63 towards each other, i.e. in the direction of the middle leg 30 of the retaining device 3, are pivoted about their respective swivel 81, 82 in a way that their ends are moved towards each other. Thereby, the lumbar support 10 is adjusted away from the supporting plate 40 along the longitudinal vehicle axis X perpendicular to the plane spanned by the longitudinal direction of the rest Z and the horizontal transverse direction Y, wherein the position of the lumbar support 10 along said longitudinal vehicle direction X is changed and/or the lumbar support 10 is bent in this direction depending on whether the support of the lumbar support 10 on the rest frame 1 allows for a displacement of the lumbar support 10 along the X-direction or merely allows for a bending.

On the other hand, in case both gliders 62, 63 are moved in opposite directions in the direction of one of the two lateral longitudinal struts 21, 22, respectively, the supporting bails 71, 72 are flapped towards the carrier plate 40, so that the bulge of the lumbar support 10 decreases or the lumbar support 10 moves again closer to the carrier plate 40 or the plane of the backrest.

By means of displacing the gliders 62, 63 along a direction Y parallel to the extension plane of the rest frame 1 by means of the supporting bails 71, 72, an adjustment of the stroke or the bulge of the lumbar support 10 in the direction of the longitudinal vehicle axis X perpendicular to the extension plane (Y-Z-plane) of the rest frame 1 can thus be conducted. This is to be lead back to the fact that the gliders 62, 63 interact according to the wedge principle with the corresponding bent sections of the supporting bails 71, 72, so that a movement of the gliders 62, 63 along the Y-direction and therefore parallel to the extension plane (Y-Z-plane) of the rest frame 1 is converted into a movement of the supporting bails 71, 72, namely a pivoting movement about the swivels 81, 82 of the supporting bails 71, 72, which comprises a component in the longitudinal vehicle direction X perpendicular to the extension plane of the rest frame 1.

Due to the symmetric arrangement of both of the supporting bails 71, 72 and of the associated gliders 62, 63 with respect to a symmetry axis running in the longitudinal direction of the rest Z, a symmetric, even bulge or adjustment of the lumbar support 10 is assured.

Figure 7:
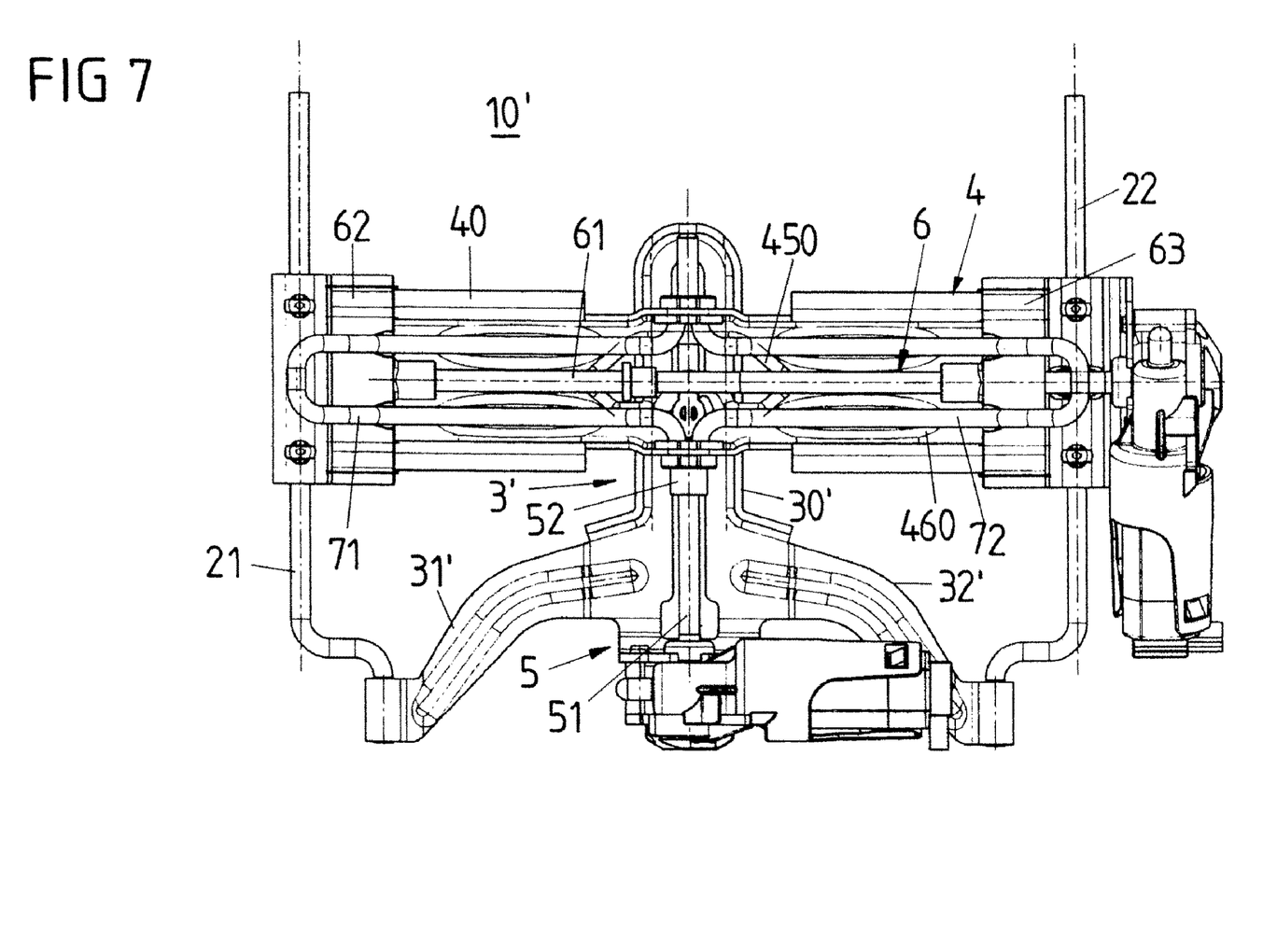
FIG. 7 shows a perspective front view of a lumbar support having a retaining device having a T- or Y-shaped retaining plate and a height and depth adjusting devices.
Figure 8:
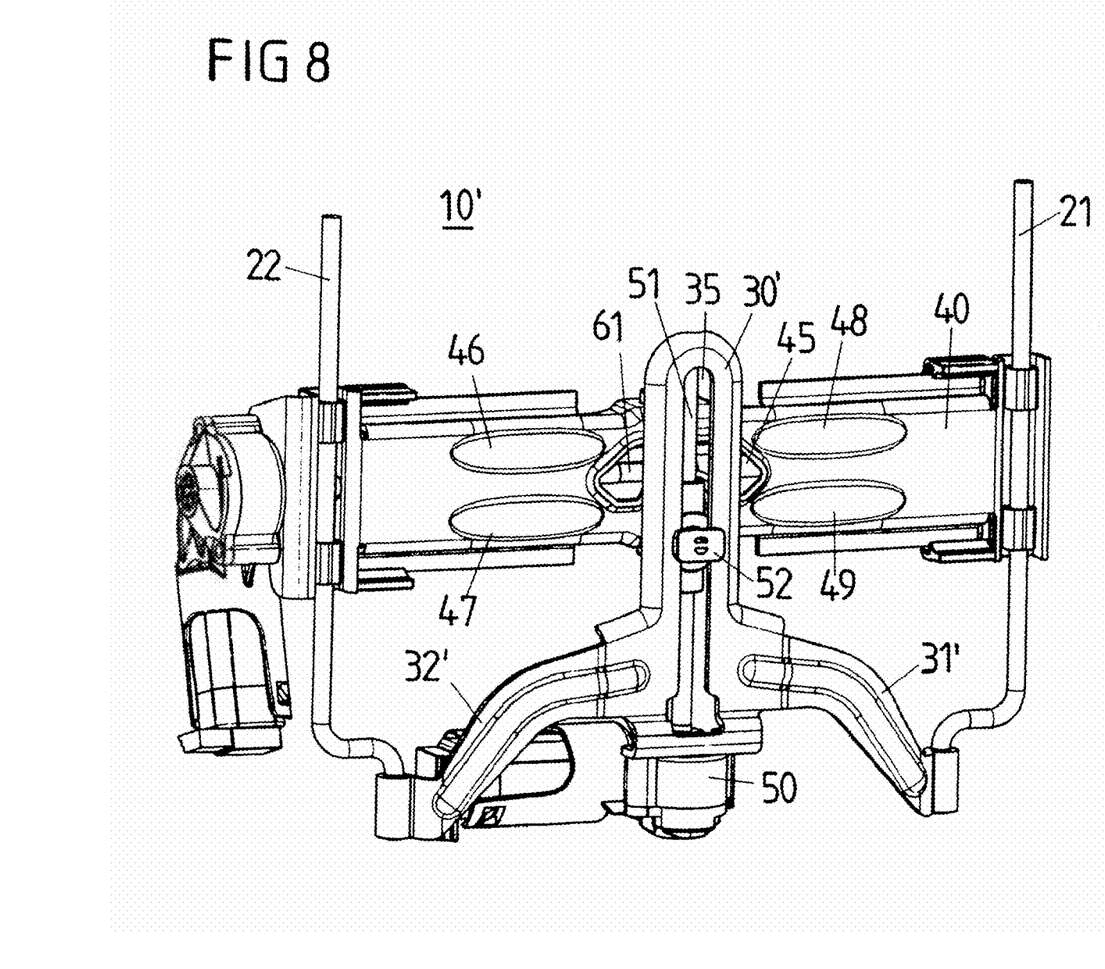
FIG. 8 shows perspective rear view of the lumbar support in a middle position of the transverse traverse.
Figure 9:
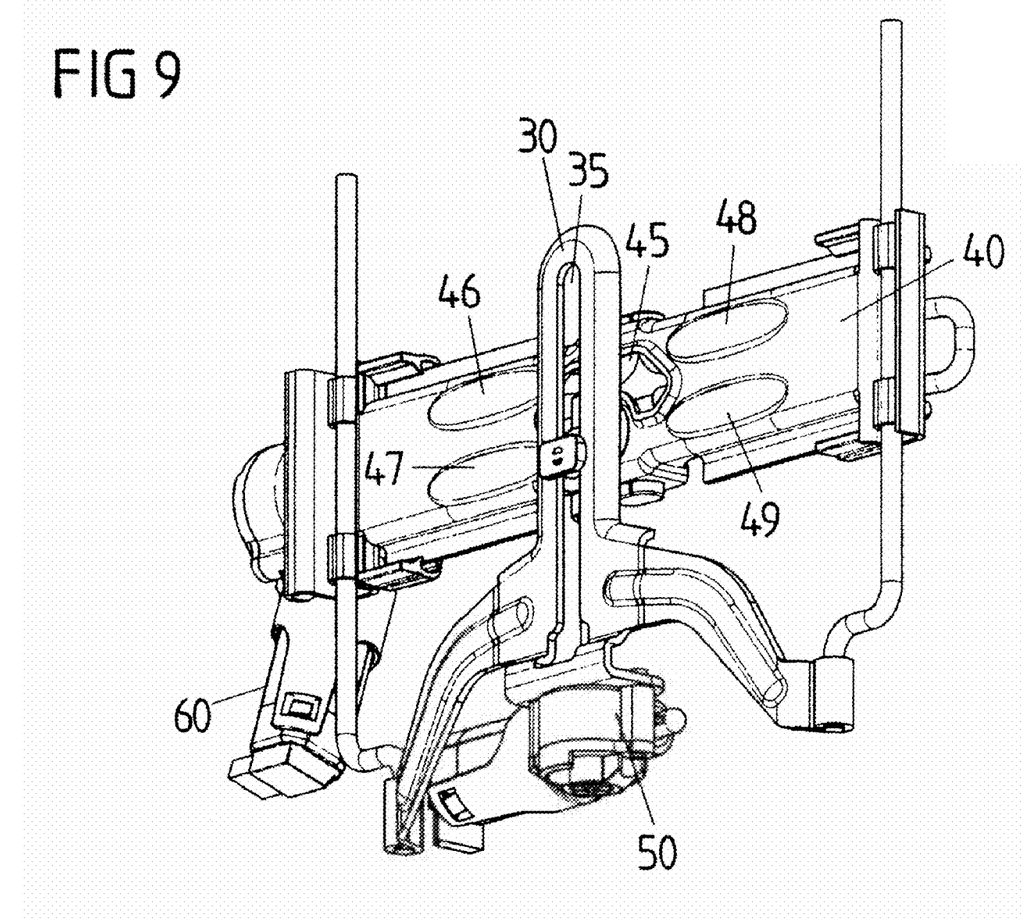
FIG. 9 shows perspective rear view of the lumbar support in a middle position of the transverse traverse.

FIG. 7 shows in a perspective front view and FIGS. 8 and 9 in a perspective rear side view a second embodiment of a backrest structure or lumbar support according to the invention.

In this second embodiment the retaining device 3' is not formed as a double-T-shaped or double-Y-shaped retaining plate in contrast to the embodiment shown in FIGS. 1 to 6, but as a single T- or Y-shaped retaining plate having a middle leg 30' and two lateral legs 31', 32' arranged symmetrically with respect to the middle leg 30', whose ends encompass sections of the transverse struts running parallel and displaced with respect to the longitudinal struts 21, 22. The design of the transverse traverse 4 as well as of the height and depth adjusting device 5 or 6, respectively, corresponds to the first embodiment shown in FIGS. 1 to 6.

In this embodiment saving weight to a notably degree, the stability and connection stiffness of the lumbar support 10' is achieved by a mutual support of the middle leg 30' of the retaining device 3' and the carrier plate 40 of the transverse traverse 4 via the spindle nut 52 connected to the transverse traverse 4 and engaging the spindle 51 of the height adjusting device 5 as well as by a support of the spindle 51 on the carrier plate of the retaining device 3'.

In this second embodiment of a cost and weight optimized lumbar support, recesses 35 and 45 to 49 are arranged in the carrier plate 40 of the transverse traverse 4 as well as in the middle leg 30' of the retaining device 3' for further weight saving as well as for reducing or for maintaining the air-conditioning function of an air-conditioned comfort seat. The recesses 35 and 45 to 49 avoid that, depending on the arrangement of a ventilator unit L (FIG. 11) of an air-conditioning device, the lumbar support moves in certain height adjustments of the transverse traverse 4 in front of the airflow generated by the ventilator unit and therefore disturbs the air-conditioning function of the motor vehicle seat to a considerable degree.

As recesses, an oval or polygonal breakthrough 45 in the center of the transverse traverse 4 as well as symmetrically thereto two oval or ellipsoid apertures 46, 47 or 48, 49 are arranged on both sides of the breakthrough 45 in the carrier plate 40 of the transverse traverse 4. For maintaining or improving the stability of the carrier plate 40 of the transverse traverse 4 the boundaries of the breakthrough 45 or of the apertures 46 or 49 are provided with beads or flanges 450, 460.

As one can infer from the pictures of FIGS. 7 and 8, the middle breakthrough 45 gives way to a larger aperture, in front of which or behind of which substantially merely the spindle 61 of the depth adjusting device 6 as well as the middle leg 30' and the spindle 51 of the height adjusting device 5 are arranged. Also the recesses 46 to 49 symmetrically arranged on both sides of the breakthrough 45 yield large area breakthroughs for an airflow generated by a ventilator unit L of the air-conditioning device. These recesses are additionally completed by a recess 35 running in the longitudinal direction of the middle leg 30' of the retaining device 3'.

Figure 10:
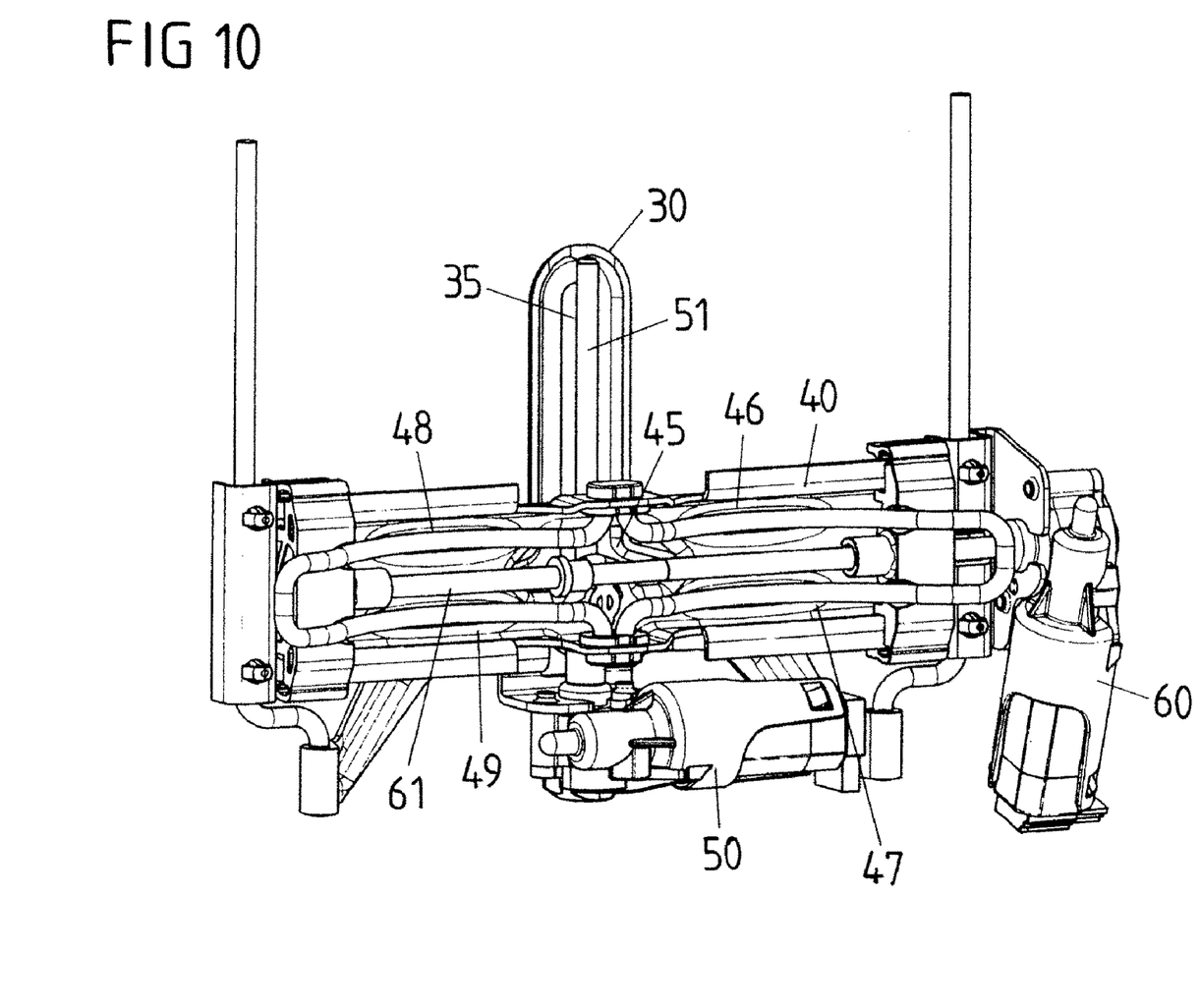
FIG. 10 shows a perspective front view of the lumbar support in a lower position of the transverse traverse.
Figure 11:
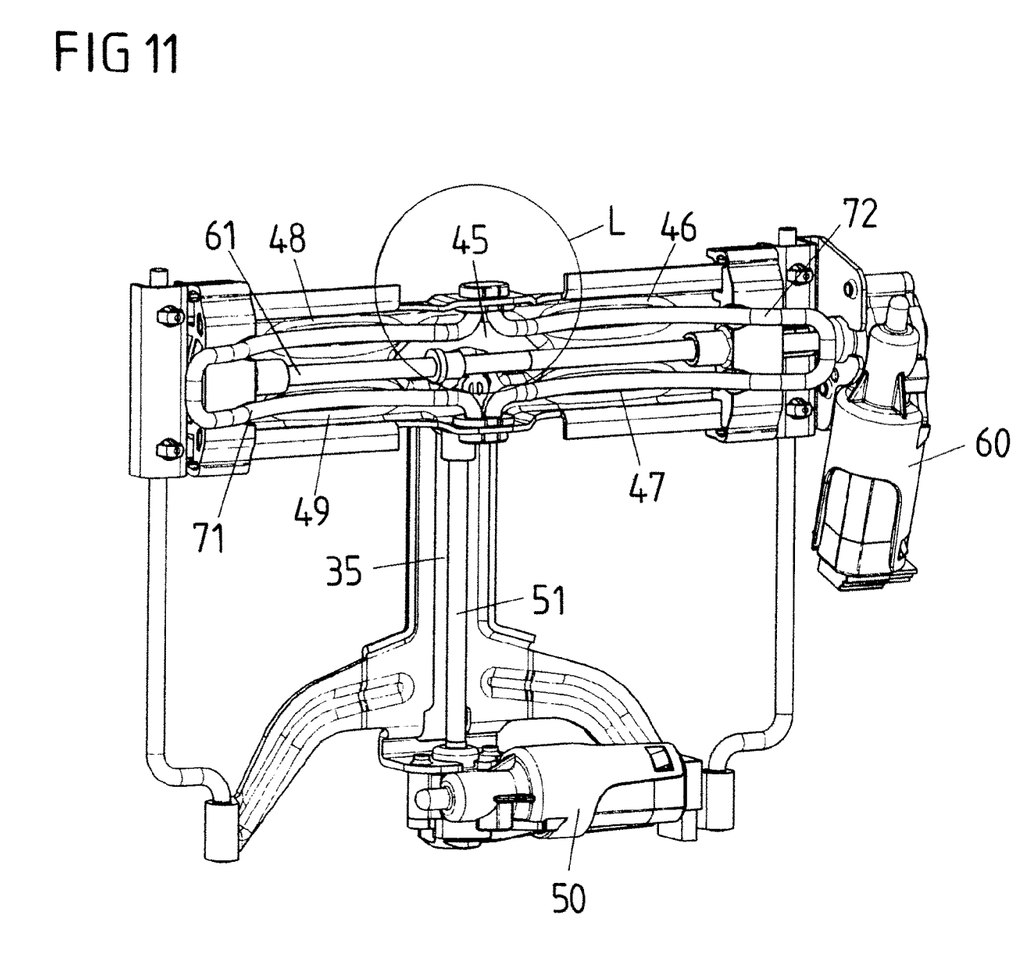
FIG. 11 shows a perspective front view of the lumbar support in an upper position of the transverse traverse with a schematic illustration of the arrangement of the ventilator unit of an air-conditioning device.

Since at least one ventilator unit of the air-conditioning device for a motor vehicle seat is arranged in a region of the lumbar support that is particularly effective for the air-conditioning of a motor vehicle seat, the recesses 35 in the middle leg 30' of the retaining device 3' as well as particularly in the carrier plate 40 of the transverse traverse 4 prove to be especially effective in all height adjustments of the transverse traverse 4, of which a lower position of the transverse traverse 4 is shown in FIG. 10, and in FIG. 11 an upper position of the transverse traverse 4 is shown.

FIG. 11 schematically shows in addition the arrangement of a ventilator unit L of an air-conditioning device and clarifies that particularly the middle breakthrough 45 in the carrier plate 40 of the transverse traverse 4 forms a large through opening for the air flow generated by the ventilator unit L which would be otherwise covered by nearly one half by the carrier plate 40 of the transverse traverse 4 without the breakthrough 45.

The further cost and weight optimization as well as the optimization of the air-conditioning function of a motor vehicle seat shown above with reference the FIGS. 7 to 11, is of course also suitable when employing the first embodiment of the lumbar support according to the invention as shown in FIGS. 1 to 6.

The invention claimed is:

1. A backrest structure of a motor vehicle seat, the backrest structure comprising:
    a rest frame forming a supporting structure, wherein the rest frame comprises at least two longitudinal struts running in a longitudinal direction; and
    a lumbar support arranged on a front side of the rest frame for supporting a back region of a motor vehicle occupant, the lumbar support comprising:
        a transverse traverse being adjustable along the longitudinal struts with a height adjusting device, wherein a support device is hinged on the transverse traverse and is adjustable substantially perpendicular to the transverse traverse with a depth adjusting device; and
        a retaining device supporting the transverse traverse and extending substantially in the longitudinal direction and receiving the height adjusting device.

2. The backrest structure according to claim 1, wherein the height adjusting device comprises a spindle that is supported on the retaining device, wherein the spindle meshes with a spindle nut connected to the transverse traverse and is drivable with a spindle drive of the height adjusting device.

3. The backrest structure according to claim 1, wherein the transverse traverse consists of a small carrier plate extending between the longitudinal struts, wherein the carrier plate is form-fittedly guided on the longitudinal struts.

4. The backrest structure according to claim 1, wherein the support device comprises two supporting bails extending perpendicular to the longitudinal direction of the backrest, wherein the bails are pivotably hinged to the transverse traverse about an axis extending in the longitudinal direction of the backrest and are pivotable towards the transverse traverse or away from the transverse traverse with the depth adjusting device.

5. The backrest structure according to claim 4, wherein the depth adjusting device consist of a spindle or a lever drive for pivoting the supporting bails.

6. The backrest structure according to claim 1, wherein the transverse traverse comprises guide rails, wherein two gliders are guided on the guide rails and are movable in opposite directions and pivot supporting bails with ramp sections formed on at least one of the gliders and the supporting bails.

7. The backrest structure according to claim 6, wherein the gliders are connected to respective spindle nuts, that engage with two thread sections, respectively, of the spindle of the depth adjusting device, wherein the two thread sections have opposite thread pitches.

8. The backrest structure according to claim 7, wherein the spindle of the depth adjusting device is drivable with a spindle drive connected to the transverse traverse.

9. The backrest structure according to claim 1, wherein the retaining device is connected to the longitudinal struts and wherein the retaining device guides the transverse traverse in an adjusting direction.

10. The backrest structure according to claim 9, wherein the retaining device comprises a middle leg butting against the transverse traverse and lateral legs extending from the middle leg, wherein the lateral legs connect the longitudinal struts to each other.

11. The backrest structure according to claim 10, wherein the retaining device is formed as a T-shaped, Y-shaped, double-T-shaped or double-Y-shaped retaining plate.

12. The backrest structure according to claim 10, wherein the lateral legs are connected to transverse struts which bend from the longitudinal struts and connect the longitudinal struts together.

13. The backrest structure according to claim 12, wherein the height adjusting device comprises a spindle that is supported on the middle leg, wherein the spindle meshes with a spindle nut connected to the transverse traverse and is drivable with a spindle drive of the height adjusting device, wherein the spindle drive is connected to at least one of the retaining device, the longitudinal or transverse struts and the rest frame.

14. The backrest structure according to claim 9, wherein the retaining device comprises a middle leg butting against the transverse traverse and lateral legs extending from the middle leg, wherein the lateral legs are connected to the longitudinal struts.

15. The backrest structure according to claim 14, wherein the retaining device is formed as a T-shaped, Y-shaped, double-T-shaped or double-Y-shaped retaining plate.

16. The backrest structure according to claim 14, further comprising at least one recess in at least one of a carrier plate of the transverse traverse, the middle leg of the retaining device and the lateral legs of the retaining device.

17. The backrest structure according to claim 16, wherein the middle leg of the retaining device comprises a recess running in a longitudinal direction of the middle leg.

18. The backrest structure according to claim 16, wherein the at least one recess consists of an ellipsoidal or polygonal breakthrough in the center of the carrier plate, wherein the breakthrough is aligned in a longitudinal direction of the carrier plate.

19. The backrest structure according to claim 18, wherein two ellipsoidal apertures are arranged on top of each other and on both sides of the breakthrough, respectively, wherein major axes of the ellipsoidal apertures are aligned parallel to the longitudinal direction of the carrier plate.

20. The backrest structure according to claim 18, wherein at least one of the breakthrough and the apertures are provided with boundary beads or flanges.

* * * * *